(12) United States Patent
Salmon et al.

(10) Patent No.: US 11,946,909 B2
(45) Date of Patent: Apr. 2, 2024

(54) MICROFLUIDIC ASYMMETRIC FLOW FIELD-FLOW FRACTIONATION DEVICE AND METHOD OF USING THE SAME

(71) Applicants: Assistance Publique-Hopitaux de Paris, Paris (FR); Centre National de la Recherche Scientifique (CNRS), Paris (FR); Institut National de la Sante et de la Recherche Medicale (INSERM), Paris (FR); Universite De Paris, Paris (FR); Ecole Nationale Superieure de Chimie de Paris, Paris (FR)

(72) Inventors: Hugo Salmon, Paris (FR); Rabah Gahoual, Paris (FR); Nathalie Mignet, Clamart (FR); Pascal Houze, Beauchamp (FR)

(73) Assignees: Assistance Publique-Hopitaux de Paris (FR); Centre National de la Recherche Scientifique (CNRS) (FR); Institut National de le Recherche Scientifique (CNRS) (FR); UNIVERSITÉ PARIS CITÉ (FR); Ecole Nationale Superieure de Chimie de Paris (FR)

( * ) Notice: Subject to any disclaimer, the term of this patent is extended or adjusted under 35 U.S.C. 154(b) by 675 days.

(21) Appl. No.: 16/971,763

(22) PCT Filed: Feb. 21, 2019

(86) PCT No.: PCT/EP2019/054365
§ 371 (c)(1),
(2) Date: Aug. 21, 2020

(87) PCT Pub. No.: WO2019/162404
PCT Pub. Date: Aug. 29, 2019

(65) Prior Publication Data
US 2021/0088483 A1    Mar. 25, 2021

(30) Foreign Application Priority Data

Feb. 22, 2018 (EP) .................................. 18305185

(51) Int. Cl.
*G01N 30/00* (2006.01)
(52) U.S. Cl.
CPC ... *G01N 30/0005* (2013.01); *G01N 2030/003* (2013.01)
(58) Field of Classification Search
CPC ................................................ G01N 2030/003
See application file for complete search history.

(56) References Cited

U.S. PATENT DOCUMENTS 7,495,210 B2 * 2/2009 Li ............................ B05B 5/03
250/281
2008/0108122 A1 5/2008 Paul et al.
(Continued)

FOREIGN PATENT DOCUMENTS

EP    2390660 B1    11/2015
WO    02070118 A2    9/2002
WO    2016139042 A1    9/2016

OTHER PUBLICATIONS

Chia-Wen, El Al., "Bonding of thermoplastic polymer microfluidics," Microfluidics and Nonofluidics, Nov. 13, 2008, pp. 1-16, vol. 6, No. 1, Springer, Berlin, DE.
(Continued)

*Primary Examiner* — Daniel S Larkin
(74) *Attorney, Agent, or Firm* — Lerner David LLP

(57) ABSTRACT

The present invention relates to an asymmetric flow field-flow fractionation device (1) configured to separate a sample (8) of particles (12) dispersed in a liquid mobile phase (11), the device including a fractionation microchannel (2) comprising a sample inlet, a sample outlet, an auxiliary microchannel (3) comprising an auxiliary outlet, a semipermeable
(Continued)

membrane (10) separating the fractionation microchannel (2) and the auxiliary microchannel (3), said membrane being permeable to liquid and being configured to maintain the particles (12) in said fractionation microchannel (2), the fractionation microchannel (2) being superimposed on the auxiliary microchannel (3), wherein the device (1) comprises two layers (19), each layer being with a microfabricated recess (14) which thickness (t) is less than $100_L$m, the membrane (10) being mechanically held in between the two layers (19), the recesses (14) respectively defining the fractionation microchannel (2) and the auxiliary microchannel (3) on each side of the membrane (10).

17 Claims, 4 Drawing Sheets

(56) References Cited

U.S. PATENT DOCUMENTS

2014/0010712 A1* 1/2014 Heerah ............... G01N 33/1826
422/69

2016/0011155 A1* 1/2016 Klein ..................... G01N 30/38
73/61.56

2017/0144151 A1 5/2017 Taniguchi

OTHER PUBLICATIONS

European Search Report for Application No. 18305185.3 dated Aug. 14, 2018, 3 pages.
International Search Report with Written Opinion for Application No. PCT/EP2019/054364 dated May 15, 2019, 21 pages.
Muller, et al., "Nanoparticle separation with a miniaturized asymmetrical flow field-flow fractionation cartridge," Frontiers in Chemistry, Jul. 22, 2015, pp. 1-6, vol. 3, Article 45.
Wang et al., "Seamless joining of porous membrane with thermoplastic microfluidic devices," Microelectronic Engineering, Mar. 7, 2013, vol. 110, pp. 386-391.

* cited by examiner

MICROFLUIDIC ASYMMETRIC FLOW FIELD-FLOW FRACTIONATION DEVICE AND METHOD OF USING THE SAME

CROSS-REFERENCE TO RELATED APPLICATIONS

The present application is a national phase entry under 35 U.S.C. § 371 of International Application No. PCT/EP2019/054365, filed Feb. 21, 2019, which claims priority from European Patent Application No. 18305185.3, filed Feb. 22, 2018, all of which are incorporated herein by reference.

TECHNICAL FIELD

The present invention relates to a fractionation device, used for instance for the characterization or the discrimination of nanoparticles, proteins, oligomer-protein conjugates, protein aggregates and/or polymers. The invention relates more specifically to an asymmetric flow field fractionation device.

BACKGROUND OF THE INVENTION

For the last two decades, nanoparticles and recombinant proteins have been introduced in the therapeutic field. Their properties have led to the development of a variety of applications, for example targeted drug delivery, imaging agents or therapeutic activity. The use in the therapeutic field of these molecules requires additional characterization, compared to smaller molecules, in order to ensure the safety of the product. As a consequence, innovative analytical methods are required to address the specific characteristics of nanoparticles and therapeutic proteins. Especially, the size of the particles present in a sample has to be investigated thoroughly. For example, the diameter of a nanoparticle has to be less than 30 nm to prevent direct elimination by the renal system. In the case of therapeutic proteins, the formation of aggregates must be limited to avoid the occurrence of immunogenic reaction and to provide an optimal activity. As part of the analytical methodology, the separation needs to be adapted to this type of particles to provide the best sensitivity and deliver information regarding the heterogeneity of the sample.

Size Exclusion Chromatography (SEC) is commonly used for the fractionation of such particles. However, the size range applicable to SEC fractionation is restricted in the range from 1 nm to 50 nm. Moreover, a column used in SEC is dedicated to a portion of the size range. SEC then requires the use of several columns to cover the entire range. Moreover, the fractionation using SEC generates back pressures of a few tenths of bars that may induce the formation of aggregates. Finally, analytical SEC is achieved with relatively important flow rates (for instance in the range from 0.3 mL/min to 1 mL/min) that are inducing dilution effect which may lead to the disassembling of non-covalent aggregates.

For this purpose, it is known to fractionate particles using an asymmetrical flow-field flow fractionation (or separation) device (AF4).

FIG. 1 is a schematic longitudinal section of an asymmetrical flow-field flow fractionation device. The particles 12 to be separated are introduced in a fractionation channel 2 in a liquid mobile phase. A laminar flow is established in the fractionation channel 2, particularly in the x relative direction. As illustrated in FIG. 1, the flow has a pseudo-Poiseuille velocity profile in the z relative direction: the velocity of the flow is higher around the middle of the cross section of the fractionation channel 2. A wall of the fractionation channel 2 is made of a semipermeable membrane 10 supported by a frit 27. The frit 27 is needed to support the membrane 10, preventing the membrane 10 ripping under the pressure in the fractionation channel 2. The membrane 10 is permeable to liquid and configured to maintain the particles in said fractionation microchannel 2. The permeability of the membrane to liquid induces a cross flow through the membrane 10 and through the frit 27 from the fractionation channel 2 to the auxiliary channel 3. Due to the cross-flow, the particles 12 are pushed towards the membrane, but at the same time diffuse at different rates, particularly in the z relative direction in the fractionation channel 2, depending on the particle size. The size dependent diffusion makes the particles of different sizes to stabilize in different z, as illustrated in FIG. 1. Because of their different positions in the z relative direction, separated particles are carried by the mobile phase at different velocities due to the applied laminar flow. Therefore, consecutive bands are formed corresponding to separated analytes or particles, the larger molecules exhibiting longer retention times in the fractionation channel 2. Such a device is described in EP 2 390 660 B1.

However, the separation efficiency of analytical AF4 is significantly below the separation efficiency of SEC in the case of their common size range, due to higher band broadening effects when using AF4. Analytical AF4 consequently exhibits poor peak capacity and significantly longer analysis time than SEC, which hinders the throughput of this technique. The application of AF4 is also conditioned to more complex instrumental settings than SEC, especially to finely tune the respective flow rates of the mobile phase and the cross flow through the membrane 10. Likewise SEC, analytical AF4 requires significant flow rates (typical total flow in the fractionation channel 2 is in the range from 2 mL/min to 10 mL/min) that in concomitance with important band broadening are leading to dilution effects of the analytes or particles 12. This effect limits the particles characterization, and more specifically the protein aggregates characterization.

Finally, a typical AF4 device is generally made of several layers defining the fractionation channel 2, including a superior plate, a spacer having a cavity defining the lateral walls of the fractionation channel 2 and a membrane 10. Other layers are defining the auxiliary channel: the membrane 10 is mechanically supported by a frit 27, the frit 27 is arranged over a spacer having a cavity defining the lateral wall of the auxiliary channel 3, the spacer is arranged over an inferior plate. These layers are generally clamped, which may lead to leaks of the mobile phase when using an AF4 device.

SUMMARY OF THE INVENTION

The asymmetric flow field-flow fractionation device of the present invention has been developed to respond at least partially to the above-mentioned issues of the prior art. The asymmetric flow field-flow fractionation device is configured to separate particles dispersed in a liquid mobile phase, and includes:
- a fractionation microchannel comprising a sample inlet and a sample outlet,
- an auxiliary microchannel comprising an auxiliary outlet, and
- a semipermeable membrane separating the fractionation microchannel and the auxiliary microchannel, said membrane being permeable to liquid and being configured to maintain the particles in said fractionation microchannel, the fractionation microchannel being superimposed on the auxiliary microchannel, wherein the device comprises two layers, each layer having a microfabricated recess having a thickness less than 100 µm, the membrane being mechanically held by encapsulation in between the two layers, the recesses respectively defining the fractionation microchannel and the auxiliary microchannel on each side of the membrane.

The membrane being mechanically held by encapsulation in between the layers and the recess thickness being less than 100 µm, a frit is no longer needed to support the membrane. Therefore, the rigidity of the membrane at this scale, combined with its encapsulation enables the device to avoid the use of a frit. Moreover, the thickness of the recess is adapted to smaller total flowrates in the fractionation channel than in the prior art, reducing the pressure applied to the membrane, preventing the membrane ripping. The thickness of the recess also prevents the diffusion of the particles 12, leading to particles band broadening.

In further optional aspects of the invention, the device comprises the following features, taken individually or in any of their technically possible combinations:

the fractionation channel comprises at least a mobile phase inlet;

the material of at least a layer, preferably both layers, is an elastomer;

the material of at least a layer, preferably both layers, is a thermoplastic elastomer, the layers being thermobonded;

the material comprises a block copolymer with a glass-transition temperature $T_g$, the glass-transition temperature is less than 0° C. and the Young modulus of the material is less than 10 MPa;

the material comprises at least one of a styrenic block copolymer and a ethylene/butylene soft block copolymer;

the fractionation microchannel width decreases from the sample inlet to the sample outlet; and the fractionation microchannel width is constant from the sample inlet to the sample outlet.

Another aspect of the present invention is a system comprising an asymmetric flow field-flow fractionation device as described in an above embodiment and a detection system, wherein the sample outlet of the device is fluidically connected to the detection system, said detection system comprising at least one of an absorption spectrometer, a spectrofluorometer, a Multi Angle Light Scattering detector, a Dynamic light Scattering detector, a refractometer, a nano-electrospray ionization mass spectrometry system and an inductively coupled plasma.

In further optional aspects of the invention, the mass spectrometry system includes a fluidic channel, a layer of the device has a recess, said recess being at least partially defining the fluidic channel.

Another aspect of the present invention is a method of fabricating an asymmetric flow field-flow fractionation device configured to separate particles dispersed in a liquid mobile phase, the method including encapsulating a membrane by putting in contact face portions of two layers, at least one layer, preferably both layers being in thermoplastic elastomer, each face portion surrounding the membrane.

In further optional aspects of the invention:

encapsulating the membrane includes heating the layers at a temperature in the range from 50° C. to 100° C.; and the face portions are put in contact less than one hour.

Another aspect of the present invention is a method of size-based particle separation comprising injecting a sample in an asymmetric flow field-flow fractionation device, the sample comprising the particles dispersed in a liquid mobile phase and the device including:

a fractionation microchannel comprising a sample inlet and a sample outlet, the sample being injected in the sample inlet;

an auxiliary microchannel comprising an auxiliary outlet;

a semipermeable membrane separating the fractionation microchannel and the auxiliary microchannel, said membrane being permeable to liquid and being configured to maintain the particles in said fractionation microchannel;

the fractionation microchannel being superimposed on the auxiliary microchannel, wherein the device comprises two layers, each layer having a microfabricated recess having a thickness less than 100 µm, the membrane being mechanically held by encapsulation in between the two layers, the recesses respectively defining the fractionation microchannel and the auxiliary microchannel on each side of the membrane.

In further optional aspects of the invention:

the fractionation channel comprises at least a mobile phase inlet; a method comprising focusing the sample in the fractionation channel by injecting the sample in the sample inlet while injecting the liquid mobile phase in the mobile phase inlet;

the method comprises injecting the sample in the sample inlet for less than 1 s while injecting the liquid mobile phase continuously;

the method includes analyzing the sample composition in particles by sequentially detecting the mean quantity of particles flowing through a detection volume in the fractionation microchannel and/or from the outlet of the fractionation microchannel;

the method incudes discriminating proteins from protein aggregates; and the method includes discriminating one of protein-oligomer conjugates and synthetic nanoparticles.

Definitions

A "particle", as used herein, encompasses any of analyte, nanoparticle, synthetic nanoparticle, protein, protein conjugate, protein aggregate, antibody, synthetic polymers, macromolecules, virus, cell and/or bead.

A "nanoparticle", as used herein, is a particle whose diameter is in the range from 0.5 nm to 500 nm.

A "microparticle", as used herein, is a particle whose diameter is in the range from 0.5 µm to 500 µm.

More generally, the prefix "micro", as used herein, defines a length in the range from 0.5 µm to 500 µm.

A "sample", as used herein, comprises particles dispersed in a liquid mobile phase.

"Focusing" particles encompasses making an initially homogenous dispersion of particles injected, subject to opposite forces, i.e. diffusion, steric effects and field-driven transport, to reach an equilibrium with a non-homogeneous distribution orthogonally to the membrane. This equilibrium may commonly be described by Fick's second law depending on particle sizes:

$$c(z) = c_0 e^{\left(-\frac{zU_z}{D^2}\right)},$$

where $c_0$ is the particle concentration, $U_z$ is analyte transverse velocity, D is diffusion coefficient of particles and z=0 corresponds to the membrane wall.

BRIEF DESCRIPTION OF THE DRAWINGS

Other features and advantages will also emerge from the following description, which is purely illustrative and non-exhaustive, and should be read in conjunction with the attached figures, among them.

DETAILED DESCRIPTION OF PREFERRED ASPECTS OF THE INVENTION

Figure 1:
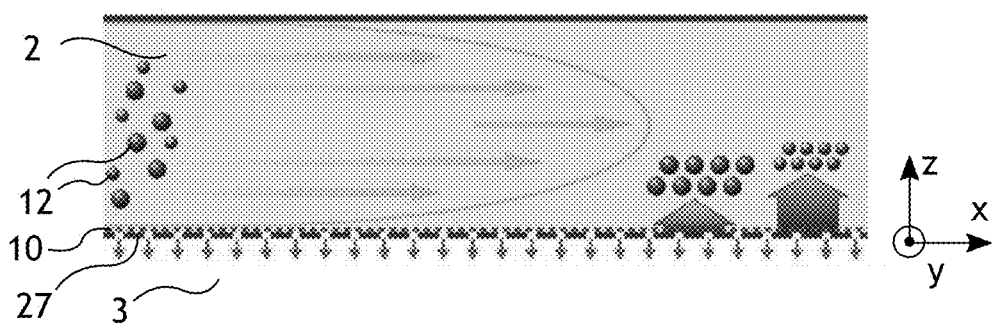
FIG. 1 is a longitudinal section of an asymmetric flow field-flow fractionation device of the prior art.
Figure 2:
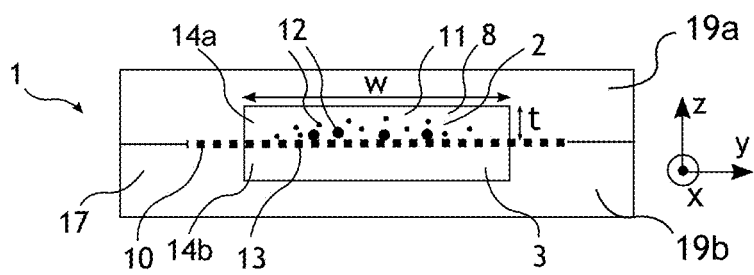
FIG. 2 is a cross section of an asymmetric flow field-flow fractionation device.

Referring to FIG. 2, the device includes a fractionation channel 2. A sample 8 comprising particles 12 of different sizes dispersed in a liquid mobile phase 11 can flow from a sample inlet 5 (not shown in FIG. 2) to a sample outlet 6 (not shown in FIG. 2). In FIG. 2, a main component of the flow is in the x direction (transverse to the cross section).

The device 1 includes a layer 19a having a microfabricated recess 14a having a thickness less than 100 μm. The recess 14a defines walls of the fractionation channel 2. Another wall of the fractionation channel 2 is defined by a semipermeable membrane 10, said membrane being permeable to liquid and being configured to maintain the particles 12 in the fractionation channel 2.

The device 1 also includes an auxiliary channel 3. The auxiliary channel 3 includes an auxiliary outlet 7 (not shown in FIG. 2). As the membrane 10 is semipermeable, the liquid mobile phase 11 can flow through the auxiliary channel 3 from the membrane 10 to the auxiliary outlet 7. Therefore, another component of the flow is in the z relative direction, through the membrane 10.

The z position of the particles 12 schematically illustrates the particle densities in an established flow: the overall particle density is the highest close to the membrane 10 in the fractionation channel 2. Moreover, the mean particle position of smaller particles 12 is higher relative to the z direction than the mean particle position of the larger particles 12.

The device 1 includes another layer 19b, partially bonded to the layer 19a, also having a microfabricated recess 14b, having a thickness t is less than 100 μm, the recess 14b defining walls of the auxiliary channel 3. The membrane 10 is mechanically held by encapsulation in between the two layers 19a,b and then separates the fractionation channel 2 and the auxiliary channel 3. The membrane 10 also defines a wall of the auxiliary channel 3.

The thickness t of each recess 14a,b defines the thickness t of the corresponding channel (fractionation channel 2 or auxiliary channel 3). The recess thickness is less than 100 μm, preferably in the range from 1 μm to 100 μm and preferably in the range from 5 μm to 50 μm.

The width w of each recess can be in the range from 1 μm to 10 cm, preferably 5 μm to 1 cm and even more preferably from 10 μm to 500 μm. This width range combined with a mechanically held membrane 10 by encapsulation in between the two layers makes possible to avoid a frit in the device 1.

Semipermeable Membrane 10

The semipermeable membrane is porous and therefore permeable to a liquid phase. The material of the membrane is preferably one of cellulose, mixed cellulose ester, polyvinylidene fluoride (PVDF), polyethersulfone (PES), polycarbonate. The size of the pores of the membrane 10 is preferably in the range from 0,010 μm to 1 μm. This range of pore size is for instance adapted to stop particles from proteins (of a few kDa) cells (of a few tenth of μm). A membrane 10 may be damaged by a heat treatment over 80° C.

Material of the Layers 19

The material of at least one of the layers 19a,b can be an elastomer. Therefore, it is possible to encapsulate the membrane 10 in between the layers 19a,b, the deformation of at least a layer 19a,b by the membrane 10, preferably of each of the layers 19a,b, assuring a conformable contact between the layers 19a,b, avoiding possible leaks and/or allowing optimum pressure of the liquid mobile phase 11. Compared to clamping, which requires clamping points on both sides of the channels, encapsulation allows a uniform contact between channels, making it possible to increase the channel density while reducing their width and thickness without leaks. The deformation of the elastomeric layer(s) 19a,b also contributes to mechanically hold the membrane 10 by a conformable contact, avoiding the need of a frit to support the membrane, and risking to mechanical damage to the membrane.

The material of the layer 19a,b is preferably a thermoplastic elastomer (TPE). Therefore, the layers 19a,b can be thermobonded and the clamping of the different layers can be avoided. The use of a thermoplastic elastomer combined with the thickness t of the recess 14a,b also makes it possible to simplify the fabrication of an asymmetric flow field-flow fractionation device 1 by microfabricating the different layers by molding. Thus, the fabrication process of the asymmetric flow field-flow fractionation device 1 can be faster and cheaper than asymmetric flow field-flow fractionation devices of the prior art.

The material of at least one of the layers 19a,b preferably comprises a block copolymer with a glass transition temperature $T_g$, $T_g$ being less than 0° C. Preferably, each layer 19a,b comprises a block copolymer with a glass transition temperature $T_g$, $T_g$ being less than 0° C. For example, one layer 19a,b can be made of ethylene and/or butylene, having a glass transition temperature $T_g$ being less than 0° C., and another layer 19a,b can be made of styrene, having a glass transition temperature $T_g$ being sensibly 100° C. Therefore, the bonding between the layers 19a,b is achieved only by bringing the two layers 19a,b in contact at a temperature being less than 100° C., preferably in the range from and 100° C. and more preferably in the range from 50° C. and 100° C., even more preferably in the range from 75° C. and 85° C. Preferably, $T_g$ is less than −30° C. and even more preferably, $T_g$ is less than −50° C.

A face 18 of a layer 19a,b is not perfectly smooth. Then, the material of the layer 19a,b has to be flexible enough so that two faces 18 of different layers 19a,b have enough surface in contact to be thermobonded. Preferably, the Young modulus of the material of at least one of the layers 19a,b is less than 10 MPa, and more preferably less than 2 MPa, and even more preferably comprised between 1.2 MPa and 1.3 MPa. Therefore, the material is flexible enough to allow for thermobonding of the layer 19a,b. Therefore, two layers 19a,b can be thermobonded to encapsulate a membrane 10 without setting a heat treatment that may damage the membrane 10. The temperature can be for example less than 80° C., preferably less than 50° C., and more preferably less than 30° C.

The material of a layer 19a,b can be selected from the group consisting of polystyrène-b-polybutadiene-b-polystyrène (SBS), polystyrène-b-polyisoprène-b-polystyrène (SIS), polystyrène-b-poly(éthylène-butylène)-b-polystyrène (SEBS), polystyrène-b-poly(éthylène-propylène)-b-polystyrène (SEPS), polystyrène-b-poly(éthylène-éthylène/propylène)-b-polystyrène (SEEPS), Flexdym™ polymer.

Microfabrication Methods

FIG. 3 to FIG. 7 illustrate sequential steps of a preferred method of fabricating the present asymmetric flow field-flow fractionation device 1.

Figure 3:
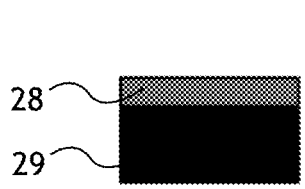
FIG. 3 illustrates a method for fabricating an asymmetric flow field-flow fractionation device.

Referring to FIG. 3, a photosensitive resin 28 (as SU8 or Ordyl™ resin) is spread over the surface of a substrate 29 by conventional spin-coating technology and pre-baked.

Figure 4:
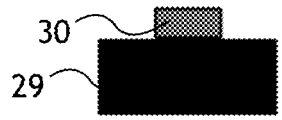
FIG. 4 illustrates a method for fabricating an asymmetric flow field-flow fractionation device.

Referring to FIG. 4, the photosensitive resin 28 is cured and selectively developed after a photolithographic step, providing a protrusion 30 and forming a mold. Protrusion 30 thickness varies with the resin viscosity and the deposition method. Exposure time and curing time change with the resin type and thickness. The thickness of the protrusion 30 corresponds to the thickness t of a recess 14a,b. Microfabricated mold may also be fabricated by a number of conventional silicon processing methods, including but not limited to stereolithography, fused deposition modeling, machining, ion-milling, and electron beam lithography.

Figure 5:
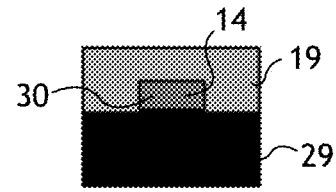
FIG. 5 illustrates a method for fabricating an asymmetric flow field-flow fractionation device.

Referring to FIG. 5, the recess 14a,b of a layer 19a,b is microfabricated by hot-embossing of a layer 19a,b of thermoplastic elastomer, for example for 2 minutes at 170° C. and at a pressure of 2 bars, casted over the mold.

Figure 6:
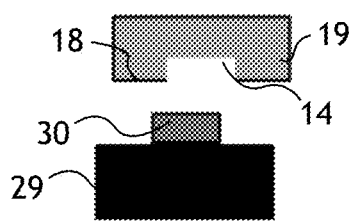
FIG. 6 illustrates a method for fabricating an asymmetric flow field-flow fractionation device.

Referring to FIG. 6, the recessed layer 19a,b is unmolded.

Figure 7:
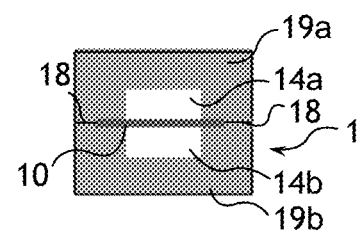
FIG. 7 illustrates a method for fabricating an asymmetric flow field-flow fractionation device.

Referring to FIG. 7, two layers 19a,b are microfabricated as described in FIG. 3 to FIG. 6. Each layer 19a,b has at least a recess 14a,b from a face 18 of the layer 19a,b. A membrane 10 is encapsulated by putting in contact face 18 portions of two layers 19a,b, each face 18 portion surrounding the membrane. Recesses 14a,b are aligned using alignment crosses so that the fractionation channel 2 is superimposed with the auxiliary channel 3. The device is placed on a hot plate at the temperature of 80° C. for thermal bonding of the layers 19a,b. More generally, heating of the layers 19a,b can be done in the temperature range from 0° C. to 100° C., preferably in the range from 50° C. and 80° C. for an irreversible bonding. Thermal bonding being due to the interpenetration of the polymers from one layer 19a,b to the other layer 19a,b, the element formed by both layers 19a,b is monolithic. The imposed contact between the faces 18 lasts preferably for more than 10 min, and more preferably for 30 min. Therefore, the bonding between the layers 19a,b can resist applied pressures of the liquid mobile phase 11 during the particles separation.

Design of the Microchannels

Figure 8A:
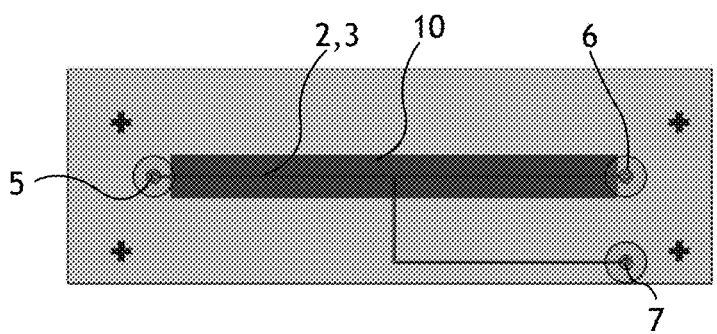
FIG. 8A and FIG. 8B are respectively a top view and an isometric view of an asymmetric flow field-flow fractionation device comprising a straight fractionation channel.
Figure 8B:
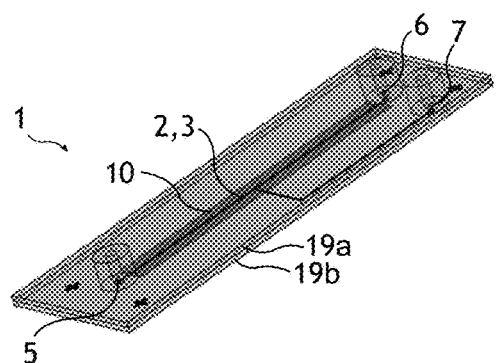

Referring to FIG. 8A and FIG. 8B, the asymmetric flow field-flow fractionation device 1 can comprise a straight fractionation channel 2. The asymmetric flow field-flow fractionation device 1 comprises a sample inlet 5. The sample inlet 5 connects the fractionation channel 2 to a channel or a conduit configured for providing a sample 8 comprising the particles 12 dispersed in a liquid mobile phase 11. The conduit can include a luer connection for a handy connection to a tube. The conduit can comprise a manifold, mechanically clamped (using screws or magnets), thermally bonded (at 80° C. for 30 s) or contacting the layer 19a,b using natural adhesion properties of the material with the layer 19a,b top face 18 portion.

A manifold can be produced using CNC machining on a hard translucent polymer material (PC, PMMA and/or baked epoxy) or 3D printing. The manifold can present a standard chromatography female fitting (UNF 1/4-28) or luer taper.

The conduit can also comprise a stud. A stud is for example glued (using Norland Optical Adhesive NOA) or thermally bonded on layer 19a,b top face portion depending on stud material (PDMS or Flexdym™ polymer). For PDMS, we apply NOA on the stud contact surface. Then, in contact with the layer 19a,b, a UV beam generated from a UV curing pointer (UTarget™ curing pointer from Black Hole Lab) is applied for 30 seconds on the NOA. When using Flexdym™ resin as the layer 19a,b material, thermal bonding at 140° C. for 20 s) of the stud on layer 19a,b is achieved before encapsulating the membrane. The 1/16 inch tube is held tight in the stud 1 mm hole. Tubing is typically used for providing the sample 8 to the conduit or directly to the fractionation channel 2. The inner diameter of the tube can be in the range from 50 µm to 1000 µm, more preferably from 100 µm to 250 µm.

The asymmetric flow field-flow fractionation device 1 comprises a sample outlet 6. The sample outlet 6 connects the fractionation channel 2 to a channel or a conduit. The conduit can include a luer connection.

The auxiliary channel 3 includes an auxiliary outlet 7. The auxiliary outlet 7 connects the auxiliary channel 3 to a channel or a conduit. The fractionation channel 2 and the auxiliary channel 3 may not be entirely superimposed (i.e. they may be superimposed only along a portion of each of the channel). Therefore, the fluidic connections to the different flow outlets can be separated.

The asymmetric flow field-flow fractionation device 1 includes two layers 19a,b and a membrane 10 forming a fractionation channel 2 superimposed to an auxiliary channel 3 as described above. The layers 19a,b can be mechanically held by a substrate (not shown), which can be made of any rigid material, such as glass, for example.

Figure 9A:
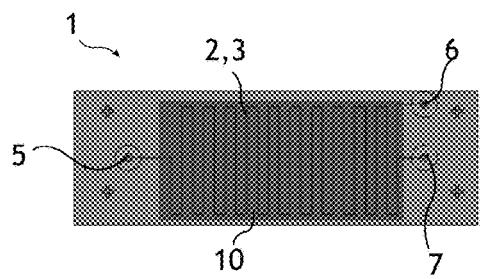
FIG. 9A and FIG. 9B are respectively a top view and an isometric view of an asymmetric flow field-flow fractionation device comprising a serpentine shaped fractionation channel.
Figure 9B:
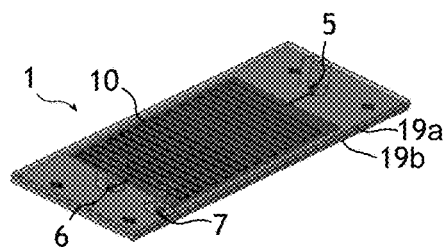

Referring to FIG. 9A and FIG. 9B, the asymmetric flow field-flow fractionation device 1 can comprise a serpentine-shaped fractionation channel 2. Generally, the design of the fractionation channel 2 and of the auxiliary channel 3 can be designed to maximize the channels lengths for a determined surface occupied by the fractionation channel 2 and by the auxiliary channel 3 on the chip. The serpentine-shaped design allows increasing the channel length for a determined surface. The length of the fractionation channel 2 and of the auxiliary channel 3 can for example be higher than 1 cm, preferably higher than 5 cm, and even more preferably higher than 10 cm.

Because of the possible direct encapsulation of the membrane by the layers 19a,b, the design of the membrane can be different than the design of the fractionation channel 2 and/or than the design of the auxiliary channel 3. For example, the membrane can cover the surface covered by the serpentine-shaped channels. In FIG. 9A and FIG. 9B, the membrane 10 is rectangular.

In another aspect of the invention, the device can also include parallel fractionation channels 2 (not shown), i.e. the sample inlet 5 can be fluidically connected to a plurality of fractionation channels 2. Therefore, multiple separations can be performed at the same time, enabling one to correct the error made in a single separation measurement.

Figure 10A:
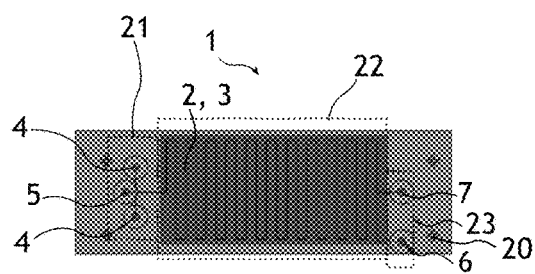
FIG. 10A and FIG. 10B are respectively a top view and an isometric view of an asymmetric flow field-flow fractionation device comprising a focusing zone.
Figure 10B:
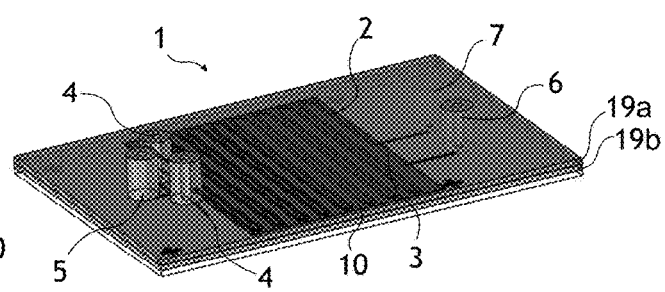

Referring to FIG. 10A and FIG. 10B, the fractionation channel 2 can comprise at least two liquid mobile phase inlets 4. The mobile phase inlets 4 connects the fractionation channel 2 to a channel or a conduit for bringing a liquid mobile phase 11 in the fractionation channel 2. The mobile phase inlets 4 can achieve two functions. Typically, plugs of sample 8 in the asymmetric flow field-flow fractionation devices are formed upstream the device sample inlet, for example, of using a switch valve. Therefore, the mobile phase inlet 4 allows for forming plugs or pulses of sample 8 in the fractionation channel 2 in the device 1, by controlling the flow rate of sample 8 from the sample inlet 5 and the flow rate of liquid mobile phase 11 in the mobile phase inlet 4. The sample 8 can be injected in the injection zone 21, where sample 8 can be injected in the sample inlet 5 and the liquid mobile phase 11 can be injected in the mobile phase inlets 4. The volume of sample 8 injected in each injected plug is preferably less than 1 µL, preferably less than 100 nL and more preferably less than 1 nL. Preferably, the sample 8 is injected for less than 5 s, preferably less than 1 s and more preferably less than 10 ms. At this stage, the particles 12 dispersed in the sample 8 are supposedly mixed in the sample 8, i.e. the particles 12 do not show different spatial distributions depending on their size.

The mobile phase inlet 4 also allows the focusing of the sample 8 upstream the fractionation channel 2. Indeed, focusing the particles 12 in the z-direction and/or in x-direction allows for a sharper separation of the particles 12 in the fractionation channel 2. FIG. 10A and FIG. 10B illustrate a device 1 comprising two liquid mobile phase inlets 4 forming a cross-junction with the sample inlet 5. Depending on the applied flow rates of sample 8 and of the liquid mobile phase 11, it is known that the sample 8 can be at least focused in the z relative direction of the fractionation channel 2 (see the z relative direction in FIG. 2). Therefore, the focusing of the sample 8 allows a relaxation between the entropic forces due to Brownian motion and flow forces, achieving a preliminary separation between particles 12 in the zone 21, without diluting the sample. Consequently, the peaks corresponding to a specific particle size population after a sample separation can be higher, narrower and more resolved than without focusing the sample 8 with a cross-junction before the separation in the fractionation channel 2. Therefore, the zone 21 can also be a focusing zone 21.

The asymmetric flow field-flow fractionation device 1 also comprises a separation zone 22, where the fractionation channel 2 and the auxiliary channel 3 are superimposed and separated by the membrane 10. The particles 12 are separated by their size in the separation zone 22, as described above.

The device can also comprise an output zone 23, comprising the sample outlet 6 and the auxiliary outlet 7.

Figure 11A:
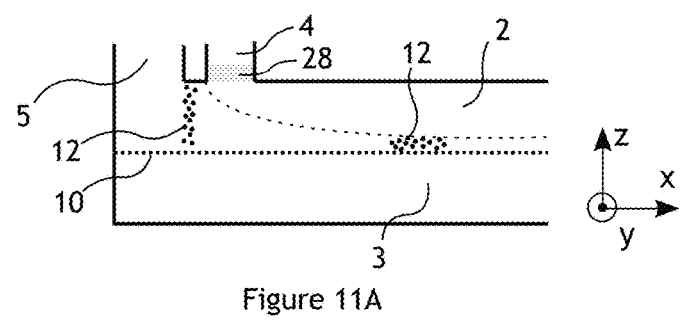
FIG. 11A schematically illustrates a focusing of particles in the fractionation channel.
Figure 11B:
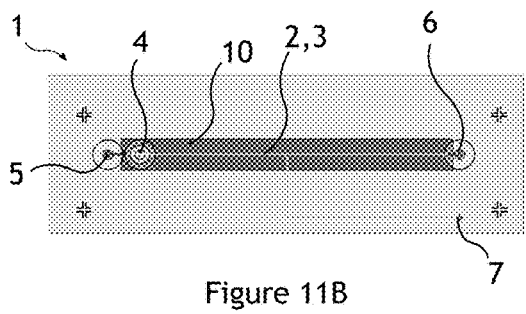
FIG. 11B and FIG. 11C are respectively a top view and an isometric view of an asymmetric flow field-flow fractionation device comprising a focusing zone.
Figure 11C:
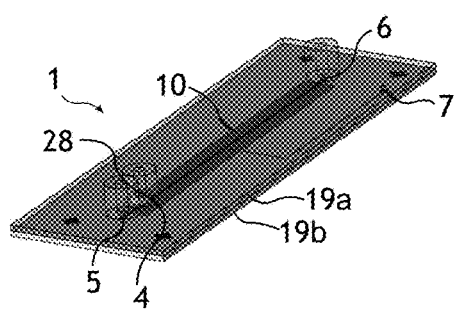

Referring to FIG. 11A, FIG. 11B and FIG. 11C, the device 1 can comprise a mobile phase inlet 4 configured to inject a mobile phase 11 into the fractionation channel 2 on the opposite side of the membrane 10. The mobile phase inlet 4 is arranged downstream from the sample inlet 5. Therefore, the sample 8 can be focused in the z-direction. Thus, the sample 8 can be relaxed without stopping the flow. An inlet frit 28 can optionally be arranged at the mobile phase inlet 4. Therefore, the liquid mobile phase 11 can be free from polluting particles.

Figure 12A:
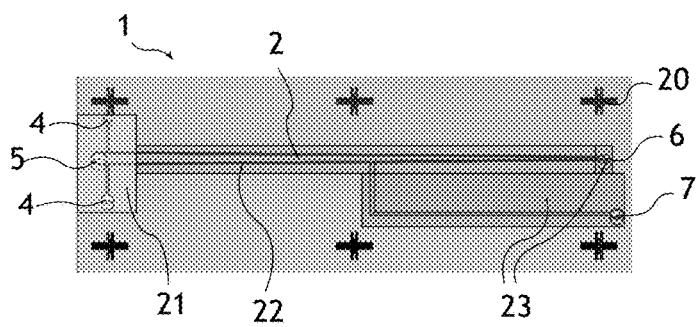
FIG. 12A and FIG. 12B are respectively a top view and an isometric view of an asymmetric flow field-flow fractionation device comprising a narrowing fractionation channel.
Figure 12B:
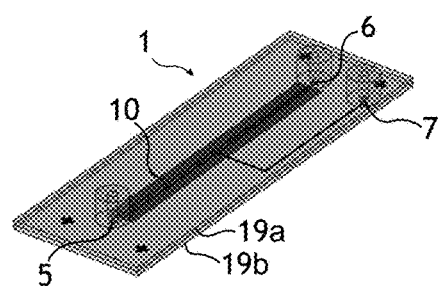

In reference to FIG. 12A and FIG. 12B, the device 1 can comprise a fractionation channel 2 or at least a portion of the fractionation channel 2 which width (in the y-direction) is decreasing when varying the x-direction, specifically from the sample inlet 5 to the sample outlet 6. Therefore, when an auxiliary flow is established, the axial velocity of the particles 12 in the fractionation channel 2 is maintained, although a part of the mobile phase 11 is continuously flowing into the auxiliary channel 3. Such a fractionation channel 2 is illustrated in FIG. 12A and FIG. 12B. The fractionation channel has a trapezoidal shape. Though a trapezoidal shape channel induces a benefit of resolution in separation, miniaturization of the separation drastically reduces the channel dead volume, thus, sample dilution. Based on the volume reduction comparison, it will predominantly impact the number of theoretical plate over a trapezoidal shape. Therefore, the fractionation channel 2 width can also be constant.

Figure 13A:
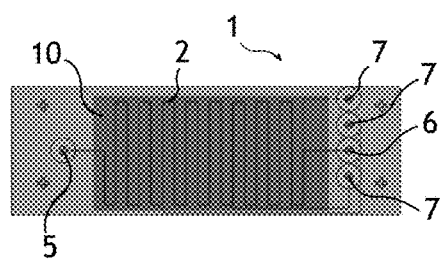
FIG. 13A and FIG. 13B are respectively a top view and an isometric view an asymmetric flow field-flow fractionation device comprising a plurality of auxiliary outlets.
Figure 13B:
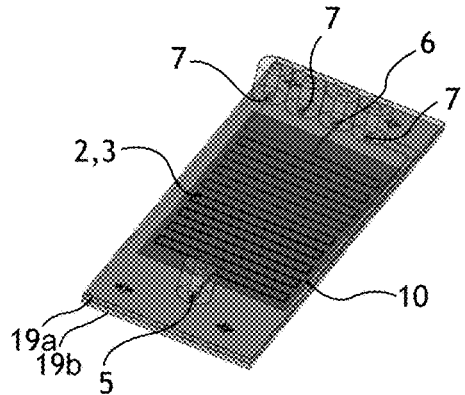

In reference to FIG. 13A and FIG. 13B, the device 1 can comprise a plurality of auxiliary outlets 7. The auxiliary channel 3 has a plurality of fluidic branches, at least one of the branches being superimposed under the fractionation channel 2. Therefore, the flowrate of liquid mobile phase 11 flowing out from the device 1 from the auxiliary outlets 7 can be controlled individually, which allows to control different flowrates in different branches of the auxiliary channel 3 which is superimposed under the fractionation channel 2. Therefore, it allows a precise control on the orthogonal force during particles 12 passage in fractionation channel 2. More generally, the portion of the auxiliary channel 3 which is superimposed under the fractionation channel 2 can be split in an integer number n of subportions, allowing an individual control of the flowrate in n distinct subportions.

Figure 14:
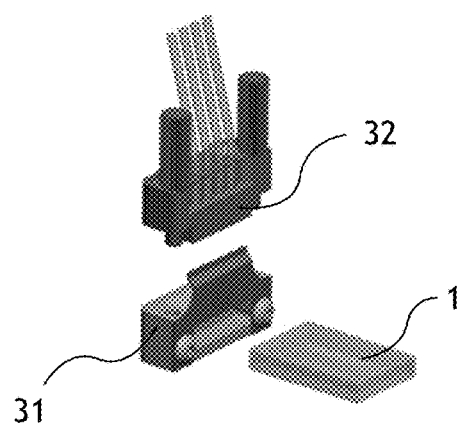
FIG. 14 illustrates a system including an asymmetric flow field-flow fractionation device.

FIG. 14 illustrates a system including an asymmetric flow field-flow fractionation device 1, an interface system 31 and a connector 32. Therefore, the microfluidic asymmetric flow field-flow fractionation device 1 can be inserted as a cartridge in the system without manual plugging or unplugging of the different tubings. The asymmetric flow field-flow fractionation device 1 can be, for example, clamped in the interface system 31, assuring liquid-tight connection. The connector 32, holding parallel tubings, providing the sample or the liquid mobile phase 11, for example, can be fluidically connected to the interface system 31, and mechanically connected to the interface system 31 by the means of lateral screws. Therefore, multiple separations of fractionations of particles 12 can be performed in a row, saving the time needed for manual plugging or unplugging and reducing the fabrication costs of an asymmetric flow field-flow fractionation device 1 by getting rid of connectors interdependent of the device 1.

Sample Preparation

The device 1 can be used to fractionate particles 12 from a sample 8, in order to collect new samples comprising particles having a monodispersed size distribution, compared to the size distribution of the particles 12 of the sample 8 injected in the device 1.

Integrated Detection

Figure 15:
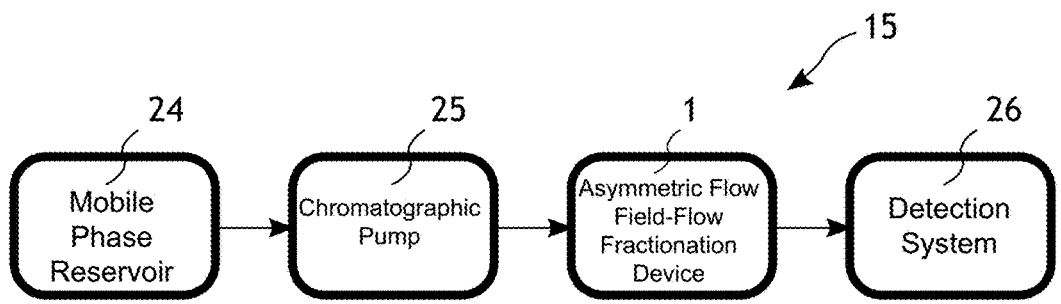
FIG. 15 illustrates a particle detection system.

Referring to FIG. 15, a fractionation system 15 can include a mobile phase reservoir 24, a chromatographic pump 25, an asymmetric flow field-flow fractionation device 1 and a detection system 26. The mobile phase reservoir 24 is fluidically connected to the chromatographic pump 25. The chromatographic pump 25 is fluidically connected to the asymmetric flow field-flow fractionation device 1. The asymmetric flow field-flow fractionation device 1 is fluidically connected to the detection system 26.

The detection system 26 can be at least one of an absorption spectrometer, for example a UV, a visible absorption spectrometer, a spectrofluorometer, a particle light scattering detector, for example a Multi Angle Light Scattering detector and/or a Dynamic light Scattering detector, a refractometer, for example a differential refractometer, a mass spectrometry system, for example a nano-electrospray ionization mass spectrometry system, a inductively coupled plasma, a liquid chromatography detector and a electrochemical detector.

Due to miniaturization constraints, in particular sample overloading, the quantity of sample 8 injected in the device is reduced. Therefore, the system 15 requires preferably a detection system 26 having a low limit of detection, preferably less than 10 ppm, more preferably less than 1 ppm. Therefore, the detection system 26 preferably comprises a nano-electrospray ionization mass spectrometry (MS) system, which detection limit is around 0.1 ppm. Moreover, the nano-electrospray ionization mass spectrometry system is adapted to detect particles in a range of flowrate overlapping the range of flowrate in the fractionation channel 2, for example from 70 μL/min to 500 μL/min.

In a preferred aspect of the invention, an on-chip mass spectrometer or an electrochemical detector can be fabricated at least partially in the same microfluidic chip than the asymmetric flow field-flow fractionation device 1. Particularly, the detection system 26 can comprise at least a detection channel defined by a recess in a layer 19a,b.

Separation

Another aspect of the invention is a method 130 of size-based particle separation comprising injecting the sample 8 into a device 1.

Figure 16:
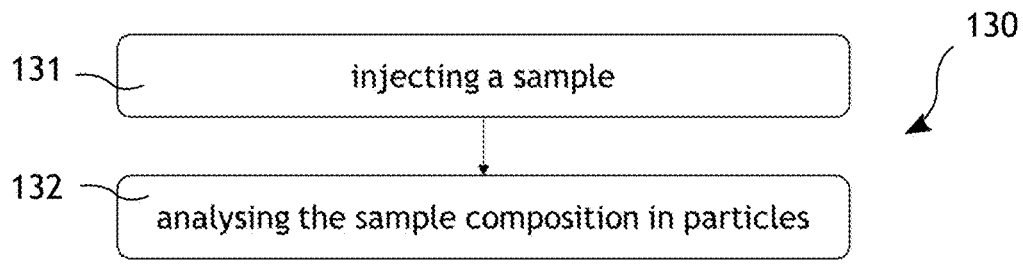
FIG. 16 illustrates a size-based particle separation method.

In reference to FIG. 16, the method 130 comprises a step 131, comprising injecting the sample 8 in the sample inlet 5 of the device 1. The sample 8 comprises the particles 12 dispersed in the liquid mobile phase 11. The particles are then separated in the fractionation channel 2 of the device 1.

In a preferred embodiment, the method 130 is a method of analyzing the sample composition in particles 12. The method 130 can comprise a step 132 of analyzing the sample composition in particles 12. Preferably, analyzing the sample composition in particles 12 can be performed by sequentially detecting the mean quantity of particles 12 flowing through a detection volume in the fractionation microchannel 2 and/or from the outlet of the fractionation microchannel 2. In an aspect of the invention, the sample outlet 6 can be fluidically connected to a detection system 26. The detection system 26 can sequentially detect the mean quantity of particles flowing through a detection volume in a fluidic channel of the particle detector 26. Therefore, the quantities of each size-separated population of particles 12 can be detected as different peaks. The detection system 26 can optionally measure the composition of the sample directly by measuring the particles 12 quantity in the fractionation channel 2, i.e. on-chip.

Figure 17:
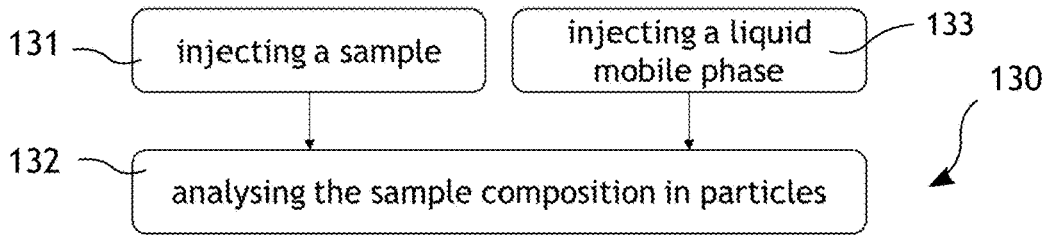
FIG. 17 illustrates a size-based particle separation method.

In reference to FIG. 17, the method 130 can comprise a step 133 of injecting a liquid mobile phase 11 in the device 1. The sample 8 and the liquid mobile phase 11 can be introduced sequentially upstream the sample inlet 5 in a conduit connected to the fractionation channel 2, for example, by the sample inlet 5.

The sample 8 and the liquid mobile phase 11 can also be injected separately to the fractionation channel 2 respectively by the sample inlet 5 and by the mobile phase inlet 4. Therefore, the sequence of sample 8 and mobile phase 11 introduced in the fractionation channel 2 can be controlled by actuating a flowrate controller of sample 8 and a flowrate controller of liquid mobile phase 11. The injection flow rate of the liquid mobile phase 11 is preferably in the range from 70 nL/min to 1 mL/min, and preferably in the range from 70 μL/min to 500 μL/min.

Injecting a liquid mobile phase 11 in a step 133 also allows for focusing the sample 8 in the fractionation channel 2. The liquid mobile phase 11 is then injected while injecting sample 8 in the device 1, i.e. step 131 and step 132 can be performed in the same time. Indeed, typical junction configuration for focusing can be arranged upstream the fractionation channel 2. For example, the liquid mobile phase 11 can be injected in the mobile phase inlet 4, preferably at a flowrate in the range of 70 nL/min to 1 mL/min and preferably in the range from 70 μL/min to 500 μL/min. The liquid mobile phase 11 can permeate into the fractionation channel 2 through the inlet frit 28. The liquid mobile phase flow meets the sample flow coming from the sample inlet 5, and compresses the sample toward the membrane wall, achieving hydrodynamic relaxation for 30 s, preferably is and more preferably 10 ms.

Figure 18:
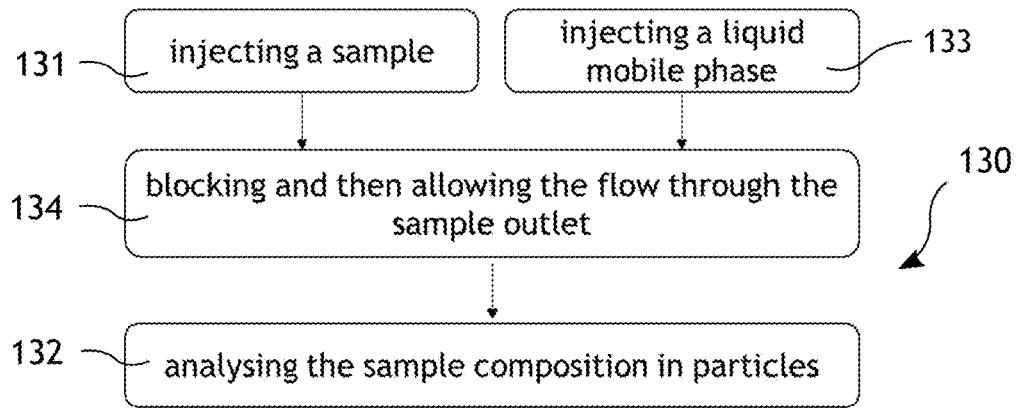
FIG. 18 illustrates a size-based particle separation method.

In reference to FIG. 18, the method 130 can comprise a step 134 of blocking and then allowing the flow through the sample outlet 6. Therefore, by blocking the flow through the fractionation channel 2, sample 8 is focused on a small portion of the membrane 10. The sample 8 is injected in the device 1 in the sample inlet 5 and focuses when meeting the membrane 10 at the membrane surface. The liquid mobile phase 11 is continuously injected during the step 134 and allows sample 8 to focus for less than 30 s, preferably less than 100 ms and more preferably less than 1 ms. Then, the flow is allowed in the sample outlet 6, for example by controlling a sample outlet 6 valve. The focused sample 8 is then brought by the flow of sample 8 and/or liquid mobile phase 11 in the fractionation channel 2 where the particles 12 of the sample 8 are separated by size.

The above-mentioned device 1 and method 130 can be particularly used for separating and analyzing the composition of a sample 8 comprising proteins and protein aggregates. Therefore, the analysis of a sample 8 comprising both proteins and protein aggregates is possible while limiting the aggregation of proteins induced by the separation technique, as the separation is possible with a pressure of the liquid phases in the device 1 being less than eight bars, preferably less than three bars. Particularly, the sample 8 can comprise therapeutic proteins, as conjugated albumin and/or monoclonal antibodies. Therefore, the stability of the proteins of a sample 8 can be evaluated by analyzing of the composition of the sample 8 by the method 130 and particularly by computing the ratio of proteins versus protein aggregates. The device can also detect and analyze the quantity of predetermined proteins and the quantity of aggregates of said proteins from therapeutic protein preparations, stability samples or eventually a patient sample, simplifying the follow-up of patients.

The size and quantity of synthetic particles 12, as nanoparticles for instance, can also be characterized utilizing the device 1. Preferably, the sample 8 can include synthetic liposomes.

The invention claimed is:

1. An asymmetric flow field-flow fractionation device configured to separate particles dispersed in a liquid mobile phase, the device including:
    a fractionation microchannel comprising a sample inlet and a sample outlet,
    an auxiliary microchannel comprising an auxiliary outlet, and
    a semipermeable membrane separating the fractionation microchannel and the auxiliary microchannel, said membrane being permeable to liquid and being configured to maintain the particles in said fractionation microchannel,
    the fractionation microchannel being superimposed on the auxiliary microchannel, wherein the device comprises two layers, each layer containing a microfabricated recess having a thickness of less than 100 µm, the membrane being mechanically held by encapsulation in between the two layers, the recesses respectively defining the fractionation microchannel and the auxiliary microchannel on each side of the membrane.

2. The device of claim 1, wherein the fractionation microchannel comprises at least a liquid mobile phase inlet.

3. The device of claim 1, wherein the material of at least one layer is an elastomer.

4. The device of claim 3, wherein the material of at least one layer is a thermoplastic elastomer, the layers being thermobonded.

5. The device of claim 3, wherein the material comprises a block copolymer with a glass-transition temperature $T_g$, the glass-transition temperature being less than 0° C. and the Young modulus of the material being less than 10 MPa.

6. The device of claim 3, wherein the material comprises at least one of a styrenic block copolymer and an ethylene/butylene soft block copolymer.

7. The device of claim 1, wherein the fractionation microchannel width decreases from a sample inlet to a sample outlet.

8. The device of claim 1, wherein the fractionation microchannel width is constant from a sample inlet to a sample outlet.

9. The device of claim 1, wherein the encapsulation is a structure in which a membrane is in contact with face portions of each of the two layers, each face portion surrounding the membrane.

10. A system comprising an asymmetric flow field-flow fractionation device according to claim 1 and a detection system, wherein a sample outlet of the device is fluidically connected to the detection system, said detection system comprising at least one of an absorption spectrometer, a spectrofluorometer, a Multi-Angle Light Scattering detector, a Dynamic Light Scattering detector, a refractometer, a nano-electrospray ionization mass spectrometry system and an inductively coupled plasma.

11. The system of claim 10 wherein the mass spectrometry system includes a fluidic channel and wherein a layer has a recess, said recess being at least partially defining the fluidic channel.

12. A method of size-based particles separation comprising injecting a sample in an asymmetric flow field-flow fractionation device, the sample comprising the particles dispersed in a liquid mobile phase and the device including:
    a fractionation microchannel comprising a sample inlet and a sample outlet, the sample being injected in the sample inlet,
    an auxiliary microchannel comprising an auxiliary outlet; and
    a semipermeable membrane separating the fractionation microchannel and the auxiliary microchannel, said membrane being permeable to liquid and being configured to maintain the particles in said fractionation microchannel,
    the fractionation microchannel being superimposed on the auxiliary microchannel, wherein the device comprises two layers, each layer containing a microfabricated recess having a thickness of less than 100 µm, the membrane being mechanically held by encapsulation in between the two layers, the recesses respectively defining the fractionation microchannel and the auxiliary microchannel on each side of the membrane.

13. The method of claim 12 wherein the fractionation channel comprises at least a mobile phase inlet, said method comprising focusing the sample in the fractionation channel by injecting the sample in the sample inlet while injecting the liquid mobile phase in the mobile phase inlet.

14. The method of claim 12, comprising injecting the sample in the sample inlet for less than 1 s while injecting a liquid mobile phase continuously during the separation.

15. The method of claim 12, including analyzing the sample composition in particles by sequentially detecting the mean quantity of particles flowing through a detection volume in the fractionation microchannel and/or from the outlet of the fractionation microchannel.

16. The method of claim 12, including discriminating proteins from protein aggregates.

17. The method of claim 12 including discriminating one of protein-oligomer conjugates and synthetic nanoparticles.

* * * * *

UNITED STATES PATENT AND TRADEMARK OFFICE
CERTIFICATE OF CORRECTION

PATENT NO. : 11,946,909 B2
APPLICATION NO. : 16/971763
DATED : April 2, 2024
INVENTOR(S) : Hugo Salmon et al.

Page 1 of 1

It is certified that error appears in the above-identified patent and that said Letters Patent is hereby corrected as shown below:

On the Title Page

Item (73), please correct the Assignees as follows:
--...Institut National de la Sante et de la Rechereche Medicale (INSERM) (FR); Universite De Paris (FR)...--

Signed and Sealed this
Seventeenth Day of June, 2025

Coke Morgan Stewart
*Acting Director of the United States Patent and Trademark Office*